United States Patent [19]

Suppiah

[11] Patent Number: 5,120,600
[45] Date of Patent: Jun. 9, 1992

[54] POROUS COMPOSITE MATERIALS AND METHODS FOR PREPARING THEM

[75] Inventor: Sellathurai Suppiah, Deep River, Canada

[73] Assignee: Atomic Energy of Canada Limited, Ontario, Canada

[21] Appl. No.: 620,383

[22] Filed: Nov. 30, 1990

Related U.S. Application Data

[63] Continuation of Ser. No. 268,887, Nov. 8, 1988, abandoned.

[30] Foreign Application Priority Data

Sep. 11, 1987 [CA] Canada .................................. 551363

[51] Int. Cl.⁵ ........................ B32B 27/00; B32B 27/32
[52] U.S. Cl. .................................. 428/323; 428/325; 428/331; 428/422
[58] Field of Search ............... 428/422, 323, 331, 327; 423/580, 335; 427/305

[56] References Cited

U.S. PATENT DOCUMENTS

| 4,025,550 | 5/1977 | Polston et al. |
| 4,061,724 | 12/1977 | Grose et al. |
| 4,194,040 | 3/1980 | Breton et al. ............ 428/422 |
| 4,563,371 | 1/1986 | Sirinyan et al. |

FOREIGN PATENT DOCUMENTS

| 536453 | 1/1957 | Canada . |
| 553800 | 3/1958 | Canada . |
| 572397 | 3/1959 | Canada . |
| 593802 | 3/1960 | Canada . |
| 637362 | 2/1962 | Canada . |
| 679631 | 2/1964 | Canada . |
| 679716 | 2/1964 | Canada . |
| 681547 | 2/1964 | Canada . |
| 718964 | 9/1965 | Canada . |
| 832603 | 1/1970 | Canada . |
| 835465 | 2/1970 | Canada . |
| 841675 | 5/1970 | Canada . |
| 841682 | 5/1970 | Canada . |
| 865612 | 3/1971 | Canada . |
| 876151 | 7/1971 | Canada . |
| 876779 | 7/1971 | Canada . |
| 062021 | 2/1975 | Canada . |
| 980038 | 12/1975 | Canada . |
| 995849 | 4/1976 | Canada . |
| 1002829 | 1/1977 | Canada . |
| 1072939 | 3/1980 | Canada . |
| 1123416 | 5/1982 | Canada . |
| 1138726 | 1/1983 | Canada . |
| 11483126 | 6/1983 | Canada . |
| 1163392 | 3/1984 | Canada . |
| 1177048 | 10/1984 | Canada . |
| 1188669 | 6/1985 | Canada . |
| 1192348 | 8/1985 | Canada . |
| 257859 | 7/1989 | Canada . |
| 94346 | 6/1982 | Japan . |

OTHER PUBLICATIONS

Brunauer, Emmett and Teller, 1938, J. Am. Chem. Soc. 60 309.
I. Langmuir, J. Amer. Chem. Soc. 34 1310. 1912.
Methods in Enzymology, vol. XLIV ed. Klaus Moshbach 1976 Academic Press, N.Y.
V. Raghavan and D. Gidaspow, 1985, AlChe Journal, vol. 31, No. 11, pp. 1791 to 1800.

Primary Examiner—Thomas J. Herbert, Jr.
Attorney, Agent, or Firm—Nixon & Vanderhye

[57] ABSTRACT

Sprayable dispersions or shaped articles are made from a material of high surface area by blending the material with polytetrafluoroethylene in the presence of a liquid. The blended material may be shaped into an article or coated onto the surface of an article. The article is then heated above 327° C. The resulting product retains high surface area, and can be used as a catalyst or catalyst support, a biological support, or an adsorbant.

22 Claims, 1 Drawing Sheet

POROUS COMPOSITE MATERIALS AND METHODS FOR PREPARING THEM

This is a continuation of application Ser. No. 07/268,887, filed Nov. 8, 1988, now abandoned.

This invention relates to novel composite solid structures and methods for preparing them.

BACKGROUND OF THE INVENTION

Many separation and reaction processes involving liquid and/or gaseous reagents require contact with a solid surface. In some cases, the solid surface provides physical sites where one or more of the steps involved in the process can occur. Examples are dehydration of ethanol with an alumina catalyst and the cracking of petroleum with molybdenum oxide catalysts. In other cases, the solid surface can support finely divided catalytic particles which are not self supporting. Examples are platinum or palladium on the surface of alumina or silica, for the catalysis of hydrogenation reactions, and iron on silica to catalyze Fischer-Tropsch reactions. The support helps to enhance the performance of the catalyst through increased dispersion. In some cases a catalyst/support interaction effect also influences the performance of the catalyst.

Solid supports are also used to support biological agents such as enzymes so that they can act upon a liquid or gaseous material.

Many physical and chemical adsorption processes also rely on materials with high surface areas for the removal of one or more of the constituents of a fluid stream. Removal of trace chemicals and water vapour from air by molecular sieves or activated carbons is an example.

In some other cases solids are used as a contact medium to promote contact between phases. For example ceramic rings are used to increase the mass transfer rates between gaseous and liquid streams in mass transfer operations.

The solid materials used to catalyze, support a catalyst or chemical or biological agent, or adsorb gas or liquid molecules or act as a contact medium will be called generically, in this disclosure, "support materials".

In the processes set out above, it is important for the support materials to have high surface areas in order to be effective for their functions. The high surface area in created by pores in the particles. When the support materials are used in their fine particle forms in packed beds, fluids cannot pass easily through the beds, leading to excessive pressure drops across such beds. Furthermore, the fine particles get entrained in the fluid stream and leave the vessel, necessitating fines removal applications downstream.

To avoid such pressure drops, it is known to deposit small particles of support materials onto carriers made of an inert material such as a ceramic. However, this has the disadvantage that much of the volume through which the fluid flows is then filled with an inert ceramic carrier, and thus the effective action of the support material per unit volume of the reaction vessel is reduced.

It has been recognized that one way of avoiding these problems is to agglomerate the particles of support material into larger shaped forms. If this could be done in such a way so as to keep a large surface area, the pressure drop problem would be reduced. However, most particles of support material do not have sufficient strength to be molded into shaped articles and to retain the moulded shapes while retaining high surface area. Sintering can be done in some cases, by using high temperature or high pressure, but this has the undesirable effect of reducing the porosity of the material by packing the particles tightly together, and the heat or pressure may also destroy the valuable properties of the material. It is possible to glue the particles together in some cases with an adhesive, but the adhesive itself covers an appreciable portion of the surface area, and can reduce the desirable properties of the material.

There are many materials in the form of fine particles which cannot be agglomerated into larger articles by any of the above conventional methods, without losing the desirable properties of such particles. For example, fine beads of styrenedivinylbenzene is one of these materials. On heating, this material decomposes, and forming by high pressure compaction or adhesive bonding causes a loss of properties.

One substance that has been used with some success to carry a catalyst is polytetrafluoroethylene (PTFE) which is manufactured for example by E.I. du Pont de Nemours & Co. under the trade mark "TEFLON". U.S. Pat. No. 4,025,560, (Rolston et al), shows the use of PTFE cubes as a catalyst support, with the catalyst on the exterior of the cubes. It has also been proposed to blend PTFE with polycarbonmonofluoride (as is shown in Japanese published application 94346/1982 (Okito)) or with up to 15% of a styrene polymer or a styrenedivinylbenzene copolymer or with fluorocarbon, as is shown in Canadian Patent 1,124,416 (Nakane et al). In the Nakane patent, the PTFE is blended with fluorocarbon or styrene(co)polymer and is then blended with a lubricant, extruded and stretched and treated with a platinum-containing agent to introduce platinum into the product. The stretching is a normal part of the treatment of PTFE compounds as such compounds are greatly increased in tensile strength by it.

While materials made by the Rolston, Okito and Nakane methods may have utility in some areas, they do not have a high ratio of surface area to volume. Therefore, in reactions where the materials support a catalyst or act as a contact medium, a large volume of such materials must be used in order to carry out reactions within a reasonable time and at a reasonable flow rate. This tends to make the use of such materials uneconomic.

SUMMARY OF THE INVENTION

The present invention provides a process for preparing shaped or coated articles of high surface area per unit of weight, comprising a support material and PTFE. The term "shaped" means that the articles are of a desired shape and are strong enough to maintain their shape and integrity under normal use conditions. For example, column packings will maintain their shapes where liquid or gaseous fluid streams are flowed over them under the conditions usually found in a packed column chemical reactor.

Sprayed coatings according to the invention will remain in place and will not crumble off within the normal ranges of temperature that the support material and PTFE are capable of withstanding. They will also withstand humidity as well as, or better than, the support material alone.

By the process of the present invention, from 0.5 to 10 parts by weight of a support material having a high surface area, and present in fine particle form, is mixed with one part by weight of fine particles of PTFE, in the presence of a liquid. If a shaped article is desired, the mixture is formed into a composite article of a suitable shape for the desired function. The shaped article is then dried and heated to at least 327° C., after which it is then ready to be used. The invention also comprises the shaped article made by this process.

If coated article is desired, fine particles of PTFE and fine particles of the support material are mixed together with a suitable liquid to form a sprayable composition. The composition is sprayed onto the desired substrate which is then dried and heated to at least 327° C. to form a coated article. Alternately the article may be dipped repeatedly into a bath of the composition to form a coating, or the coating can be painted onto the article. The invention also comprises the coated article made by the process.

The term "high surface area" as used herein means a specific surface area of at least 50 $m^2$ per gram of support material.

DETAILED DESCRIPTION OF THE INVENTION

Figure 1:
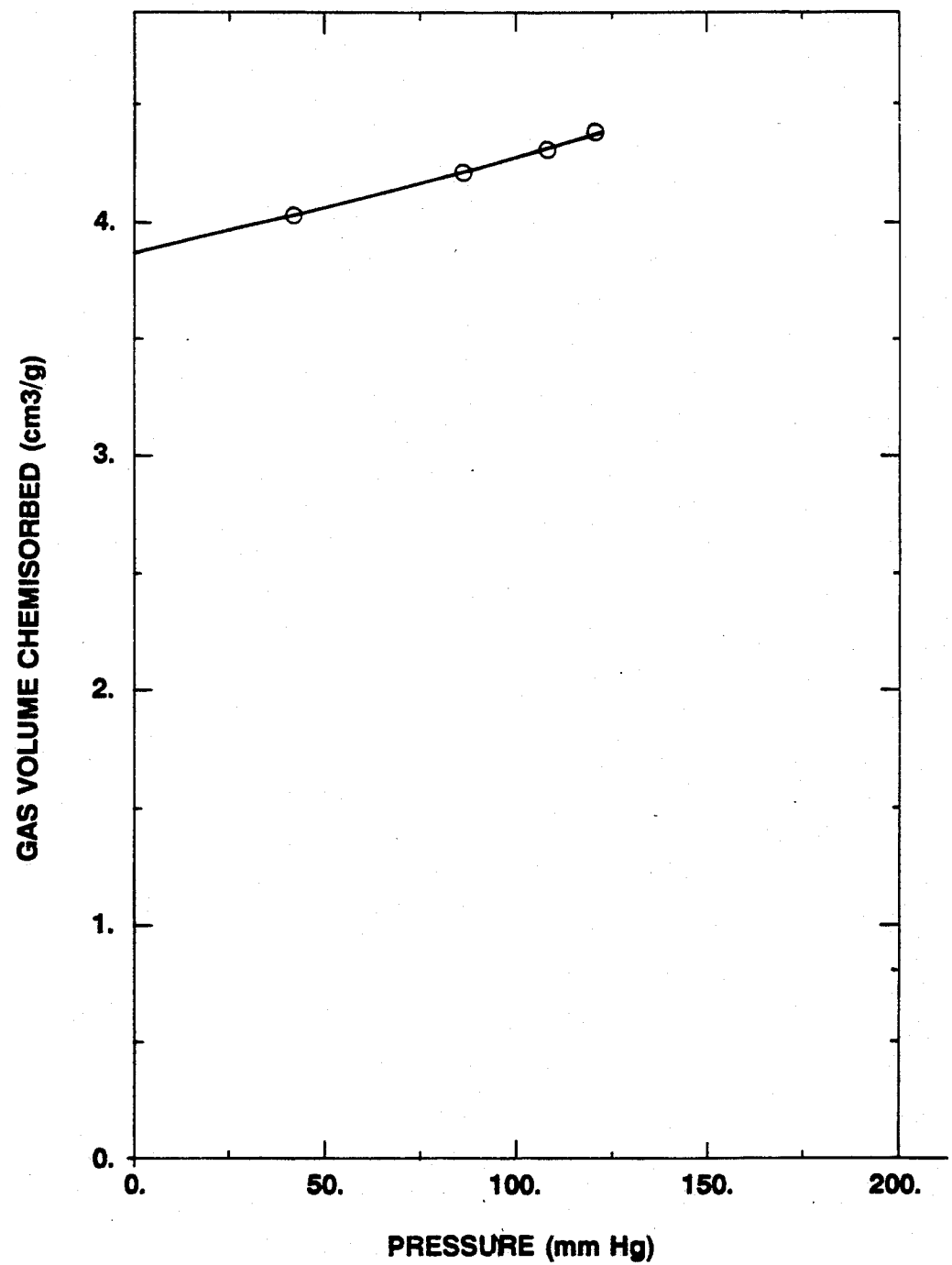
FIG. 1 is a plot of the amount of hydrogen taken up by the support and Pd versus equilibration pressure.

The process of the present invention is used with finely divided particles of support materials such as carbon, activated carbon, fluorinated carbon, alumina, silica, silicalite (a highly oriented silica described in U.S. Pat. No. 4,061,724 of Grose et al.) fumed silica, alumina, styrenedivinylbenzene copolymers, polystyrene, zeolites, and metal oxides such as oxides of tin, molybdenum oxides and titanium oxides. Suitable support materials are those which can be heated to temperatures above about 327° C. without decomposition when in admixture with PTFE. Where the material would decompose in air at 327° C., it will be suitable if it can be so heated in an inert atmosphere. The purpose of the invention is to obtain a product which retains much of the surface area of the original material, but which is sprayable or formed into self-supporting shapes.

In the process of the invention, the support material is first crushed if necessary to yield very fine particles, ranging in size from about 0.001 microns to about 500 microns. The preferred size range is from 44 microns to about 149 microns (i.e. U.S. sieve sizes 325 to 100), although for certain materials smaller sized particles give a very satisfactory result. If the support material is already present in the form of fine particles, the crushing step can be omitted.

PTFE is then blended with the support material. The size of the PTFE particles chosen is dependent upon the size of the particles of support material. It is desirable that the PTFE not have appreciable amounts of fines which will block pores in the support material. Thus, PTFE of a size smaller than the pores of the support material should be avoided. Generally, also, PTFE particles which are larger than the support material particles are not preferred as they may, on melting, cover too much of the support material. With these criteria in mind, one skilled in the art can readily choose PTFE particles of suitable size. Generally, the PTFE particles used will be in the range from about 0.05 microns to 150 microns, although smaller or larger particles can be used. Both the support material and the PTFE may be present as a range of sizes if desired. Thus for example, in a case where the support material ranges in size from 50 microns to 200 microns, and has approximately 90% of its pore sizes below 0.05 microns, a PTFE powder having a range of sizes from 0.2 microns to 10 microns is suitable.

PTFE powder suitable for use in the invention can be any of the commercially available PTFE homopolymer powders. Particularly preferred is dispersion polymerized PTFE. Tetrafluoroethylene copolymers are also usable if they have melting properties similar to PTFE, i.e., if they melt without flowing appreciably. An example of a suitable material is "TEFLON 30" (T.M.), a suspension of dispersion polymerized PTFE particles in water sold by E.I. Dupont de Nemours and Co.

Blending of the support material and PTFE may be carried out in several different ways. The method depends on the physical properties of the support material and PTFE. The support material and PTFE should be blended in such a way that the PTFE is present uniformly in the mixture. To obtain a uniform mixture it is usually necessary to introduce a liquid into the solid mixture. In general, if the support material is wettable by water then water may be used as the liquid, but if it is hydrophobic then an organic solvent may be used. If the support material is hydrophilic, it may be convenient to provide the PTFE as a water suspension, in which case the water in the suspension may be sufficient.

The sequence of addition of the solids and the liquid will also depend on the nature of the solids. For example if the PTFE is available as a powder then both solid materials may be blended first by conventional solid mixing methods and then the liquid may be added gradually, working it into the solid mixture. When the solid mixture attains a dough-like consistency the addition of the liquid is stopped.

In another embodiment, a slurry of the support material may be formed in water or an organic solvent. To this slurry, the PTFE in solid or suspension form is added and blended well to obtain a uniform mixture. If too much liquid is present in the mixture, then it may be evaporated till it reaches the required consistency.

In still another embodiment where the PTFE is present in an aqueous suspension, the support material is added to the suspension and blended well. If the water present in the PTFE suspension is not sufficient then more water may be added prior to or after adding the support material.

When mixing a slurry of the support material in an organic solvent with the aqueous suspension of PTFE, care should be taken that the organic and aqueous phases do not separate out, as this makes the mixing operation more difficult. One way of avoiding this problem is to maintain the amounts of water and organic solvent at the minimum levels possible to maintain the slurry.

Suitable organic solvents for use in the process are those which are commonly used as extrusion agents or organic solvents. Mixtures of petroleum distillates, such as those sold under the trade names "LIGROINE" (T.M.) or "SHELLSOLV" (T.M.), or kerosene can be used. The solvent which is used should of course be one which does not react substantially with the support material or cause its surface area to decrease.

One simple way of forming various shapes of articles from the dough-like paste is extrusion. Conventional single screw or double screw or piston type extruders may be used. Since this is a wet extrusion process an extruder which is suitable for wet extrusion, as known in the art, should be used to avoid the separation of the solids from the liquid in the extruder.

If the intended use is as a catalyst or column packing, then the extruded shape can be an extended ribbon of a cross-section which has sufficient inherent strength for use in a reaction situation where fluids are flowed over it. Many shapes are in common use for catalysts or column packings. Among these are cylindrical pellets, rings, saddles, sheets and the like. The ribbon can then be severed at convenient lengths as is known in the art of column packing formation, to make articles of a convenient size for the intended purpose. As an example, rings of an outside diameter of 4 mm and an inside diameter of 3 mm and a thickness of 2 mm are a typical shape for use in column packing.

Instead of extruding the paste, it can be rolled or calendared into sheets. If desired, shaped pellets can be made by forming a thick sheet through rolling or calendering, then punching out shapes of the desired shape. Generally, a higher ratio of PTFE to support material should be used when or material is extended or calendered into sheets than when the same material is extruded into shapes with longer cross-sections. Alternately, the paste can be mixed with more liquid to make a slurry which can be spray-coated onto substances with conventional spray-coating equipment. Preferably, the liquid is the same one as was used to form the paste. Two immiscible liquid phases should of course be avoided.

A suitable ratio of support material to PTFE on a weight to weight ratio, is from about 0.5 parts to 5 parts of such material per part of PTFE and preferably from 0.7 parts to 3 parts per part of PTFE for most materials. Higher ratios, of up to 10 parts of material for part of PTFE, are suitable with some materials, such as silicalite and molybdenum oxide. Styrenedivinylbenzene copolymer blends with PTFE are hard to extoride, so, when styrenedivinylbenzene is the chosen material and the forming process is extrusion, ratios over 1:1 are not preferred. It is particularly surprising that materials having as much as 10 parts of support material to PTFE should be formable and that the product should have high surface area. The art teaches that the blending of PTFE with other materials gives a product which is very difficult to form or extrude, and that only very small amounts of other materials (such as, for example, up to 15%) can be added without adversely affecting the extrusion properties. See for example Canadian Patent 1123416 (Nakane). Further, the art teaches that when paste extrusion is used for PTFE, the product is void free, i.e. has a small surface area relative to its mass or volume. See, for example, Canadian Patent 841,675 (Hopkin).

Once the forming has been carried out, the product is preferably then dried to remove the organic solvent and/or water. A temperature of from 100° C. to 150° C. has been found to be suitable. It is preferred to raise the temperature very gradually to the desired range as, with some products within the scope of the invention, there is shrinking and cracking if the heating is too intense or rapid. However, in cases where such shrinking or cracking is tolerable, a faster rise in temperature can be permitted.

Once the solvent and/or water has been removed, the material is heated to a temperature at or above the melting temperature of PTFE (327° C.) to permit some melting of the PTFE, which melting apparently aids in the strengthening of the product. Because PTFE degrades at the temperatures over above 400° C. it is desirable to heat at a temperature below 400° C., although heating at over 400° C. for short periods is possible where some PTFE degradation can be tolerated. Suitably, the heat treatment is carried out at 327° C.–365° C., for a period of from one minute to sixty minutes, although shorter or longer times may be usable in particular circumstances. The preferred heating time at this temperature is 5–30 minutes. Heating for too long a time will cause a reduction in the available surface area of the product, possibly because melting PTFE covers some of the pores and surface of the material. Therefore, with a particular product, it will be necessary to test by heating for a range of periods, to find a suitable period which increases the strength of the product to the desired amount, without undue degradation of the amount of surface area.

Conveniently, the drying step can be carried out as the temperature is being raised to the melting temperature of PTFE. A separate drying step is therefore often not required.

If the support material is combustible, or degrades when heated in air, the heating should be carried out under an inert atmosphere, such as nitrogen. This is advisable with such support materials as polydivinylbenzene, styrenedivinylbenzene polymers, polystyrene, activated carbon, polyacrylimide or other organic materials. It is found that the presence of the PTFE gives increased temperature stability to some organic support materials, and that they can be heated without decomposition when in admixture with PTFE, although they would degrade if heated alone.

In usual extrusion technology involving PTFE, the extrusion step is followed by a stretching step, to orient the PTFE fibres for greater strength. Although a stretching step can be carried out if desired with the articles of the present invention, such a stretching step is not necessary, as the forming, followed by the heating step as described above, gives sufficient strength for the formed articles to be self-supporting.

The invention will now be explained with reference to certain examples.

EXAMPLE 1

A naturally-occurring zeolite material was crushed to yield particles smaller than 74 microns. Particles larger than 74 microns were removed by sieving. The surface area of the crushed product was determined by the BET method (Brunauer Emmet and Teller [1938] J. Am. Chem. Soc. 60, 309) to be 284.8 $m^2$ per gram. 100 grams of the crushed zeolite was blended with 50 grams of PTFE solids present as TEFLON 30 [T.M.], a PTFE powder suspension in water (65% PTFE, 29.2% water, 5.8% surfactant) made by E.I. Dupont de Nemours & Co. A wet paste resulted. This was dried for about 5 minutes at 120° C., to remove some of the water, and was then kneaded to form a stiff paste. The paste was flattened and passed through two rollers to make a sheet approximately 5 mm thick. Right cylinders of 4.6 mm diameter and 5.0 mm in length were then punched out of the sheet using a cork borer. The cylinders were dried for one hour at 120° C., and were then heated gradually to 365° C. and maintained for ten minutes at 365° C.

The surface area in $meters^2$ per gram of the cylinders of composite material was determined using the BET method. The surface area of the composite material was found to be 170.8 m² per gram. As cured PTFE has a negligible surface area relative to that of the zeolite, it could be calculated what the effective surface area of the zeolite in the composite material was. Such calculation showed an effective surface area of 256.2 m² per gram.

Thus, the loss in effective surface area of the zeolite after incorporation of PTFE, was only 28.6 m² per gram. The composite material made by the present process, however, was rigid right cylinders, suitable for column packing, whereas the zeolite used, in its original form, had been fine particles.

EXAMPLE 2

30 grams of the composite material made in Example 1 (zeolite and TEFLON 30 [T.M.]) was placed in a column, and moisture saturated humid air was passed through it at a flow rate of 120 cubic centimeters per minute (STP). The dew point of the air exiting the column was measured. The results were as follows:

| Accumulated Time Min | Dew Point °C. |
| --- | --- |
| 0 | −48.8 |
| 40 | −53.4 |
| 90 | −52.6 |
| 160 | −51.8 |
| 240 | −51.1 |
| 280 | −50.8 |
| 320 | −50.2 |
| 380 | −49.4 |
| 434 | −32.7 |
| 440 | −30.5 |
| 465 | −22.6 |

These results show that the zeolite functioned well, over a considerable period of time as an adsorbant to remove moisture from the air passing through the column, despite the fact that it was contained in a composite material.

EXAMPLE 3

Example 1 was repeated, but with a 1:1 ratio of PTFE to zeolite. The composite material was 4.5 mm in diameter, and was cut into 4.5 mm long right cylinders. The effective surface area of the composite material, by the BET method, was 95.2 m² per gram, which corresponds to a surface area of 190.5 m² per gram of zeolite present.

EXAMPLE 4

1000 grams of PTFE (TEFLON 30 [T.M.] having a particle size of 0.2 microns) was mixed with 500 grams of crushed silica ("HSA Silica" Brand from the Norton Chemical Process Products Company) having a particle size of 0.074 mm and smaller. A small amount of water was added to form a doughy paste. The paste was flattened and passed through two rollers to yield a 2 mm thick sheet. The sheet was passed through a shredder, to give squares 6.9 mm×6.9 mm×2 mm. These squares were dried at 130° C. for one hour, and were heated gradually to 365° C. and kept at that temperature for 15 minutes. They were then tested by the BET method for their effective surface area.

The effective surface area found for the composite material was 41.0 m² per gram. This corresponds to a surface area of 123.1 m² per gram for the silica present. The squares were self-supporting and were suitable as column packing.

A sample of the silica used in this example was tested for its surface area, and was found to have a surface area of 138.7 m² per gram. Thus, the calculated surface area of the silica present in the composite material is only slightly less in terms of surface area than the original silica.

EXAMPLE 5

Equal weights of PTFE (TEFLON 30 [T.M.]) present as a suspension in water and fumed silica (CAB-O-SIL EH-5 [T.M.], made by Cabot Corp.) were blended together and made into a paste by adding a small amount of water. The particle size of the PTFE was 0.2 microns and the particle size and fumed silica was approximately 7 nanometers. The pasty material was extruded through a small piston-type bench extruder into a 4.6 mm diameter cylindrical extrudate, which was dried for one hour at 120° C. It was then severed into right cylinders of 5 mm lengths, then heated to 365° C. for twenty minutes. The surface area was found by the BET method to be 56.7 m² per gram. This corresponds to a calculated surface area for the fumed silica present of 113.4 m² per gram.

The surface area of the sample of the fumed silica, in its original form, was found to be 380.0 m². However, the original fumed silica was in the form of fine particles, which would not have been usable as a column packing, whereas the composite product of the invention was self-supporting and usable as a column packing.

EXAMPLE 6

Styrenedivinylbenzene copolymer sold under the trade name XAD-4 [T.M.] by the Rohm & Haas Company was crushed and passed through a screen having openings of 0.074 mm. The particles which passed through the screen were mixed with an equal weight of PTFE (TEFLON 30) [T.M.] having a particle size of 0.2 microns. The particles were blended with Ligroine [T.M.] (an organic solvent) and were extruded through the same extruder apparatus as described in Example 5 but with a larger orifice than used in Example 5, resulting in a cylindrical extrudate of 10 mm in diameter. The extrudate was severed into right cylinders about 13 mm in length. The cylinders were dried for one hour at 120° C., and were then heated to 365° C. for twenty minutes.

The surface area of the composite product was found by the BET method to be 263.8 mm² per gram. From this, it was calculated that the catalytic surface area of the styrenedivinylbenzene copolymer present was 527.6 m² per gram. A sample of styrenedivinylbenzene copolymer of the type used in the example was tested, and was found to have a BET surface area, in its original form, of 780.0 m² per gram. Thus, the loss in surface area during the making of the composite was approximately 252.4 m² per gram. However, the composite material was in the form of self-supporting cylinders, whereas the original styrenedivinylbenzene copolymer was fine bends not suited to column packing.

EXAMPLE 7

The styrenedivinylbenzene copolymer-PTFE composite material made in Example 6 was tested as a hydrogen isotope exchange catalyst after being platinized by dipping in chloroplatinic acid in ethanol. The platinum loading obtained was 0.5% platinum. The $K_ya$ values obtained in two separate runs were 1.92 and 1.77 respectively at 1 m/sec. (velocity corrected to STP) 115

EXAMPLE 8

Activated carbon sold under the trade mark DARCO CARBON by Atlas Powder Co. was obtained in the form of granules of approximately 1.20 mm in largest dimension. These granules were crushed. A portion of the granules having particle sizes of 0.074 mm and below was mixed with an equal weight of PTFE (T.M. "TEFLON 30") having a particle size of 0.2 microns. A second portion of carbon having a particle size of 0.149 mm and below was mixed with an equal weight of PTFE (T.M. "TEFLON 30") having a particle size of 0.2 microns and below. Each of these two mixtures was then mixed with LIGROINE (T.M.) petroleum solvent to make an extrudable doughy paste, and extruded through a slit orifice to form a 2.4 mm thick sheet. The sheets were dried for 1 hour at 120° C. and were then heated to 365° C. for 20 minutes. Each of the sheets was then tested to find its BET surface area and a calculation was made to find the BET surface area of the activated carbon in such sheet. The results were as follows:

TABLE

| Original Particle Size | Surface area of Composite Material | Surface area of Activated Carbon |
| --- | --- | --- |
| 0.074 mm and below | 180.9 | 361.8 |
| 0.149 mm and below | 245.1 | 490.2 |

The BET surface area of the activated carbon, in the form of the granules prior to crushing, was determined to be 517m$^2$ per gram.

EXAMPLE 9

Carbon black sold under the trade mark XC-72 by Cabot Corp. was crushed and 100 g of crushed particles which passed through a sieve of 0.074 mm square openings was mixed with 100 gm of PTFE (TEFLON 30) [T.M.] having a particle size of 0.2 microns. The mixture was blended with enough Ligroine [T.M.] organic solvent to make an extrudable doughy paste. The paste was extruded through a slit extruder to form a sheet 5 mm in thickness. The sheet was dried for 1 hour at 120° C., then heated to 365° C. for 20 minutes.

The composite sheet of carbon black and PTFE was platinized by dipping in chloroplatinic acid to obtain a platinum loading of 5.0% by weight. The platinized sheet was then used for hydrogen isotope exchange. The $K_y a$ result was 2.29 sec$^{-1}$. This compares very favourably with conventional sheet catalysts for hydrogen isotope exchange.

EXAMPLE 10

Molecular Sieve 13X (T.M. for a zeolite manufactured by Union Carbide Corp.) was crushed and particles larger than 74 microns were discarded. The particles smaller than 74 microns were blended with water and TEFLON 30 [T.M.], a PTFE powder suspension in water prepared by E.I. du Pont de Nemours & Co. The PTFE and the zeolite were present in a 1:1 ratio by weight. The mixture was diluted with water to a sprayable consistency and was sprayed onto a 5 MHZ quartz crystal to form a thin coating. The sprayed crystal was then cured at 365° C. in a helium atmosphere for fifteen minutes.

EXAMPLE 11

The coated crystal from the above example was used to detect water vapour in a nitrogen stream passing over the crystal. A small nitrogen stream was saturated with water vapour at room temperature and mixed with a larger stream to yield the required concentration for the experiment. The total flow of gas passing over the crystal was 1.51 L/min. Monitor readings as a function of time and concentration were taken using a Sloan Digital Thin Film Monitor. The monitor readings show in arbitrary units the variation of thickness of the thin film coating as water vapour is adsorbed, and the resulting change in frequency of the crystal oscillator. The monitor readings show that an equilibrium is established for each concentration of water vapour. This fact can be used for measuring the concentration of water vapour in an atmosphere.

TABLE

Thin film monitor response as a function of time and concentration of water vapour. Concentration in parts per million by weight.

| Time (min.) | Monitor Reading | | | |
| --- | --- | --- | --- | --- |
| | 85 ppm | 112 ppm | 226 ppm | 384 ppm |
| 0.4 | | | 1525 | |
| 0.6 | | 1400 | 1925 | 2100 |
| 1.0 | 1470 | 1800 | | |
| 1.5 | | | | 2310 |
| 1.6 | 1565 | | | |
| 2.0 | 1650 | 1855 | 2050 | 2410 |
| 6.0 | 1695 | 1880 | 2105 | 2510 |
| 10.0 | 1695 | 1890 | 2120 | 2520 |
| 14.0 | 1695 | 1895 | 2130 | 2530 |
| 20.0 | 1710 | 1895 | 2145 | 2540 |
| 30.0 | 1705 | 1890 | 2145 | 2540 |

EXAMPLE 12

An alumina composite was prepared from "Met-Pro" [T.M.] alumina powder with particle size in the range of 100 to 200 mesh (U.S. sieve sizes) and a surface area of about 100m$^2$/g. The alumina powder was mixed with PTFE (TEFLON 30) [T.M.] in the ratio of 1 to 1 (by weight) and made into a paste. This paste was then placed in a lay-flat plastic tube and passed through a set of rollers to form 8.75 cm wide by 1.0 mm thick film. The film was then slowly heated to 365° C. and maintained at this temperature for about 15 minutes.

EXAMPLE 13

The composite film made in Example 12 was impregnated with an aqueous solution of palladium chloride (0.75 g of PdCl$_2$ in 100 ml of water) and exposed to C0 in air at 753 ppm concentration. The colour of the film changed from pale yellow to grey on exposure indicating that the PdCl$_2$ was reduced to Pd metal by C0.

EXAMPLE 14

Fumed silica sold under the name CAB-O-SIL EH-5 [T.M.] by Cabot Corp. had nominally 9% Palladium incorporated in it by ion exchange with tetraaminepalladium chloride monohydrate under caustic conditions. The fumed silica was mixed with PTFE (TEFLON 30) [T.M.] in a ratio of 0.25 parts PTFE per part of palladized fumed silica. Sufficient water was added to form a paste. The paste was made into a thick film as in Example 12. The film was slowly heated to 365° and maintained at that temperature for about 20 minutes.

EXAMPLE 15

Hydrogen uptake of the composite fumed silica-PTFE film containing Pd from example 14 above was determined by the classical hydrogen chemisorption method (I. Langmuir, J. Amer. Chem. Soc., 34, 1310 (1912)). The sample was outgassed to a pressure of about 15 mPa at 150° C. It was then reduced in hydrogen at 150° C. at 40 kPa for two hours, and again outgassed at 150° C. and 15 mPa. Following this surface cleaning procedure hydrogen gas was introduced into the sample container and the amount of hydrogen gas taken up after 16 hours by the silica support and Pd was determined by a volumetric method. This procedure was repeated three more times, each time increasing the hydrogen pressure. Only 90 minutes were allowed for equilibration for each of these steps. From the intercept of the plot of the amount of hydrogren taken up by the support and Pd versus equilibration pressure (FIG. 1), the amount of hydrogen gas taken up by Pd alone was determined to be 53.5 $cm^3 g^{-1}$. This value is calculated from the total amount of palladium present in the composite.

EXAMPLE 16

Activated black sold under the trade mark HAY-CARB type YAO by Haycarb Ltd. Corp. was crushed, and 100 grams of crushed particles which passed through a sieve of 0.044 mm square openings was mixed with 100 grams of PTFE (Teflon 30) [TM] having a particle size of 0.2 microns. The mixture was diluted with water to the consistency of a paint. A helium-3 detector, used for detecting slow neutrons in physics experiments was dismantled. The detector was a stainless steel cylinder approximately 11 cm long with a single wire anode in it. The interior of the cylinder was painted with the carbon-PTFE mixture. The painted cylinder was then cured at 365° C. to form a composite film with good adhesion on the interior of the cylinder. The film was 0.1 mm or less in thickness. The detector was then reassembled and filled with helium and argon gas as is usual with such detectors.

The detector was then tested by exposure to slow neutrons. It was found that the energy resolution of the detector had improved from a previous figure of 10% full width half maximum to 7% full width half maximum. This indicated that the activated carbon-PTFE film removed water vapor and impurities from the sealed device, thereby making it more effective.

EXAMPLE 17

Styrene divinylbenzene copolymer sold under the trade name "XAD-4" by the Rohm & Haas Company was crushed and passed through a screen having openings of 0.044 mm. 20 grams of the SDB powder was mixed with 33 grams of PTFE (Teflon 30) [TM] present as a 60.6% dispersion of PTFE in water. Ligroine [TM] organic solvent was added and the material was worked until it became dough-like in consistency. The material was placed into plastic lay flat tubing and was passed through rollers set at a 0.25 mm gap. The material was removed from the tubing and air dried to form a film. After air drying, the film was cured in helium by heating at 100° C. for one hour, 250° C. for one hour, and finally 365° C. for one-half hour. Once the film had cooled to room temperature, it was cut into three squares of 6.3 cm by 6.3 cm by 0.25 mm thick.

The three films were then wetted by soaking with ethanol and were rinsed with water. Nitration was performed by adding 200 ml of a 47:53 v:v solution of $HNO_3/H_2SO_4$ to the wet films, while occasionally turning over the films. On completion of the nitration, the acid solution was decanted out and the films were washed with multiple rinsings of water. The films were then reduced with a solution containing 15 grams of sodium bisulfite and 20 grams of sodium hydroxide in 250 ml of water. The solution was heated to 70° C. and then it was added to the wet films. The temperature of the films was kept at 70° C. After completion of reduction, the solution was decanted out and the films were again washed with water. Finally, the films were dried by heating under helium at 140° C. for two hours. The nitration time, the reduction time and the initial and final weights are given in the following table:

| Sample | Nitration Time (min.) | Reduction Time (Hrs) | Initial Weight (g) | Final Weight (g) |
|---|---|---|---|---|
| 1 | 25 | 2 | 2.8023 | 3.1824 |
| 2 | 25 | 5 | 3.0196 | 3.4877 |
| 3 | 60 | 18 | 2.9970 | 3.4793 |

The products were suitable for the attachment of enzymes by known techniques. For example they can be washed with guteraldehyde, followed by washing with a buffer solution and contact with the desired enzyme, generally as described in *Methods in Enzymology*, vol. XLIV, edited by Klaus Mosbach, (1976) Academic Press N.Y.

Instead of making a film using the novel composite materials of the invention, it is possible to coat such composite materials onto commercially available membranes by repeated dipping into a dispersion of the composite material. The coated membrane can then be nitrated, and enzymes attached as discussed in Example 17. Similarly, the coated crystal of Example 10 can be nitrated and can have enzymes attached as discussed in a Example 17.

METHODS OF USING THE INVENTION

From the above examples, it will be seen that the products of the present invention retain a major portion of the surface area of the support materials from which they are made. However, they are much more easily handled, and can be used as column packing materials, whereas the fine particle forms of the surface active materials could not be.

As shown in Example 11 the materials of this invention can be used to make novel detecting devices, whereby small concentrations of a gas or liquid can be detected and measured by reason of the change they cause in the mass of a thin film. An equilibrium is established for each concentration. This can be useful, for example, to measure the amount of water vapour in an atmosphere. Alternatively a biological entity, such as an antibody or enzyme, can be immobilized on the crystal, and the assembly can be used as a biosensor to detect another entity with which the biological entity reacts.

The adsorbency of the compounds of the present invention can be used to cause the materials to adsorb chemicals for use in a chemical reaction, as shown in Example 13. This can be used for the purpose of detecting small amounts of dangerous chemicals, such as carbon monoxide.

The composite solids of the present invention can also be used in the form of beads or extruded forms as supports for biological entities such as antibodies of enzymes. The antibodies or enzymes can be attached by physical adsorption, or, if desired, the composite materials can be treated chemically to produce functional groups such as amines on which the biological entities may be attached.

If desired, the composite material can be extruded as a film or sheet, as in Example 16 and the enzyme or other biological entity can be immobilized on the surface of the composite sheet, either by absorption or by attaching it to a functional group such as an amine.

In another embodiment, a coating of the composite may be sprayed, painted or dipped onto a commercially available membrane designed for separation applications. This coating can then be treated chemically to provide functional groups to which the biologically active material can be attached, such as, for example, amines, hydroxyl or carboxyl groups. The resulting product is a biologically active membrane.

Conducting polymers such as polypyrrole can also be combined with PTFE according to the invention to form a composite which has the conducting properties of a polymer and the physical integrity provided by the composite.

The present composite materials can also be provided with larger pore sizes, if this is desired. This can be done by the inclusion of a decomposable, soluble or foamable product in the paste which is formed and heated. A suitable additive is, for example, a compound which liberates ammonia when heated, such as ammonium chloride or ammonium bicarbonate. Other suitable foamable products will be known to those skilled in the art. Alternatively (if the liquid used to form the paste is not water, the additive can be or water soluble material which is then dissolved out after the heating step the material must of course be stable at the temperature of the heating step. Suitable water soluble materials are KCl and NaCl. Further, the composite material in the present invention can be impregnated with catalysts such as platinum, palladium or other noble metal catalysts, as for example by treatment with $H_2 Pt Cl_6$ or $Pd Cl_2$ in known manner, to act as noble metal catalysts. They may also be impregnated with a chemical which participates in a chemical reaction or acts as a chemisorbant. For example, silver can be used to absorb quantities of hydrogen to remove it from an atmosphere. Also triethanolamine can be impregnated to react with and remove $SO_2$ from an atmosphere.

Thus, the materials of the present invention provide catalytic, ion exchange, chemical support and column packing materials which can be tailored for a large number of uses, and which can be simply and easily obtained by the process of the present invention.

It will be understood that the foregoing description is by way of example only, and that variations therein will be evident to one skilled in the art. Accordingly, it is understood that the invention is not to be limited by the particular embodiments disclosed.

What is claimed is:

1. A shaped article, which article comprises particulate material having a surface area greater than 50 $m^2$/gram intermixed with polytetrafluoroethylene, said particulate material being present in an amount from 0.5 parts to 10 parts of such material per part of polytetrafluoroethylene, said shaped article produced by blending said particulate material and said polytetrafluoroethylene with a liquid wherein said blending does not substantially affect the surface area of such material, whereby to make a paste;

forming said paste into a desired shape; and heating the formed shape at a temperature above 327° C. and below the decomposition temperature of such shape for a period from about 1 minute to about 60 minutes in an atmosphere in which the said shaped article is stable.

2. A shaped article as claimed in claim 1, in which said article has been shaped by extrusion.

3. A shaped article as claimed in claim 1, in which said article has been shaped by extrusion and at least one subsequent forming step.

4. A shaped article as claimed in claim 1, in which the particulate material is a surface active catalyst.

5. A shaped article as claimed in claim 1, in which the particulate material is an adsorbant.

6. A shaped article as claimed in claim 1, in which the particulate material is selected from the group consisting of carbon, activated carbon, fluorinated carbon, silica, fumed silica, alumina, silicalite, zeolites, polystyrene, styrenedivinylbenzene copolymer, molybdenum oxides, titanium oxides and tin oxides.

7. A shaped article as claimed in claim 1 in which the particulate material is styrene divinylbenzene copolymer, and the ratio of said material to polytetrafluoroethylene is from 0.5 parts to 1 part of such material per part of polytetrafluoroethylene.

8. A shaped article as claimed in claim 1 in which the particulate material is activated carbon.

9. A shaped article as claimed in claim 1 in which the particulate material is silica.

10. A shaped article as claimed in claim 1 in which the particulate material is silicalite.

11. A shaped articles as claimed in claim 1 in which the particulate material is fumed silica.

12. A shaped article as claimed in claim 1 in which the particulate material is fluorinated carbon.

13. A shaped article as claimed in claim 1 comprising on a weight basis, from 0.5 parts to 10 parts of silica having a surface area of greater than 50 $m^2$/gm and 1 part of polytetrafluoroethylene, said article having been heat treated at a temperature of between 327° C. and 385° C. for from one to thirty minutes.

14. A shaped article as claimed in claim 1 comprising on a weight basis, from 0.5 parts to 10 parts of styrenedivinylbenzene copolymer having a surface area of greater than 50 $m^2$/g and 1 part of polytetrafluoroethylene, said article having been heat treated at a temperature of from 327° C. to 385° C. in an inert atmosphere for from one to thirty minutes.

15. A surface coating which comprises 1 part of polytetrafluoroethylene, and from 0.5 to 10 parts of a finely divided material having a surface area of greater than 50 $m^2$/g, said surface coating having been treated at a temperature of from 327° C. to 385° in an inert atmosphere for from one to 30 minutes.

16. A crystal oscillator coated with a sprayed surface coating as claimed in claim 15 and which has a surface area greater than 50 $m^2$/gram intermixed with polytetrafluoroethylene, the particulate material being present in an amount from 0.5 parts to 10 parts of such material per part of polytetrafluoroethylene.

17. A crystal oscillator as set out in claim 16, in which the finely divided particulate material is a zeolite.

18. A crystal oscillator as set out in claim 16 in which the average particle size of the polytetrafluoroethylene is greater than the average pore size of the particulate material.

19. A crystal oscillator as set out in claim 16 in which the polytetrafluoroethylene is dispersion polymerized polytetrafluoroethylene with a particle size in the range from 0.05 microns to 10 microns.

20. An article as claimed in claim 16 in which the article has biologically-active groups such as enzymes attached to the particulate material, whereby the article functions as a biosensor.

21. A crystal oscillator as set out in claim 16, which has been treated at a temperature of from 327° C. to 385° C. in an inert atmosphere for from one to 30 minutes.

22. An article as claimed in either of claims 1 or 21 in which said material is present in an amount of from 0.7 to 5 parts for each part of polytetrafluoroethylene.

* * * * *